US011301335B2

(12) United States Patent
Joshi et al.

(10) Patent No.: US 11,301,335 B2
(45) Date of Patent: Apr. 12, 2022

(54) DATABASE BACKUP PERFORMANCE

(71) Applicant: International Business Machines Corporation, Armonk, NY (US)

(72) Inventors: Juilee A. Joshi, Pune (IN); Kapish Kumar, Bangalore (IN); Rohit Raut, Pune (IN)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 16/808,536

(22) Filed: Mar. 4, 2020

(65) Prior Publication Data
US 2021/0279142 A1  Sep. 9, 2021

(51) Int. Cl.
| G06F 12/00 | (2006.01) |
| G06F 11/14 | (2006.01) |
| G06F 9/54 | (2006.01) |
| G06F 16/22 | (2019.01) |
| G06F 16/182 | (2019.01) |

(52) U.S. Cl.
CPC .......... *G06F 11/1464* (2013.01); *G06F 9/544* (2013.01); *G06F 11/1461* (2013.01); *G06F 11/1469* (2013.01); *G06F 16/1824* (2019.01); *G06F 16/2282* (2019.01)

(58) Field of Classification Search
CPC ............. G06F 11/1464; G06F 11/1461; G06F 11/1469; G06F 16/1824; G06F 16/2282; G06F 16/11; G06F 16/113; G06F 16/122; G06F 9/544
See application file for complete search history.

(56) References Cited

U.S. PATENT DOCUMENTS

| 6,427,161 | B1 * | 7/2002 | LiVecchi | ............... G06F 9/4881 |
| | | | | 719/315 |
| 9,519,523 | B2 | 12/2016 | Dunn | |
| 9,904,721 | B1 | 2/2018 | Holenstein | |
| 2018/0210753 | A1 | 7/2018 | Gleyzer | |

OTHER PUBLICATIONS

Parekh et al., "Throttling Utilities in the IBM DB2 Universal Database Server", Proceeding of the 2004 American Control Conference Boston, Massachusetts Jun. 30-Jul. 2, 2004, 0-7803-8335-4/04, © 2004 AACC, 6 pages.

* cited by examiner

*Primary Examiner* — Shawn X Gu
(74) *Attorney, Agent, or Firm* — Stephanie L. Carusillo

(57) ABSTRACT

The indication of a database backup process starting is received. A plurality of buffer manipulator threads are marked as active. A determination is made whether any of the plurality of buffer manipulator threads marked as active in the database backup process become idle. In response to determining that at least one buffer manipulator thread in the database backup process becomes idle, the at least one idle buffer manipulator thread is reassigned to a first largest tablespace in the database that has not completed the database backup process. The first largest tablespace has a largest storage capacity relative to other tablespaces in the database.

20 Claims, 3 Drawing Sheets

DATABASE BACKUP PERFORMANCE

BACKGROUND

The present invention relates generally to the field of database performance, and more particularly to improving the performance of the database backup process.

Databases are widely used by many Enterprises. A database is an organized collection of data, generally stored and accessed electronically from a computer system. Where databases are more complex, they are often developed using formal design and modeling techniques. There are many different types of databases; a partial list of types includes the centralized database, the distributed database, the end-user database, the operational database, the relational database, and the cloud database.

SUMMARY OF THE INVENTION

Embodiments of the present invention include an approach for improving the performance of the database backup process. In one embodiment, the indication of a database backup process starting is received. A plurality of buffer manipulator threads are marked as active. A determination is made whether any of the plurality of buffer manipulator threads marked as active in the database backup process become idle. In response to determining that at least one buffer manipulator thread in the database backup process becomes idle, the at least one idle buffer manipulator thread is reassigned to a first largest tablespace in the database that has not completed the database backup process. The first largest tablespace has a largest storage capacity relative to other tablespaces in the database.

DETAILED DESCRIPTION

Embodiments of the present invention recognize that backing up a database is a critical part of any disaster recovery plan. The backup process for a database can be quite time consuming depending on the size (i.e., the amount of data stored) of the database. Ensuring that the backup process completes in a reasonable timeframe means that there will always be a valid backup of the data available in case of an emergency. A system is needed for improving the performance of the database backup process.

Embodiments of the present invention recognize that there may be a method, computer program product, and computer system for improving the performance of the database backup process. In an embodiment, the method, computer program product, and computer system utilize idle buffer manipulator (db2bm) threads to improve the performance speed of the backup process. The db2bm threads become available when the tablespace they are backing up has completed the backup process. In the normal backup process, idle threads are terminated and removed by the database manager (db2agent); therefore, it is not obvious to improve the backup process by using these threads. However, by using the idle buffer manipulator threads instead of terminating and removing said threads allows the overall database backup process to be completed in less time.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
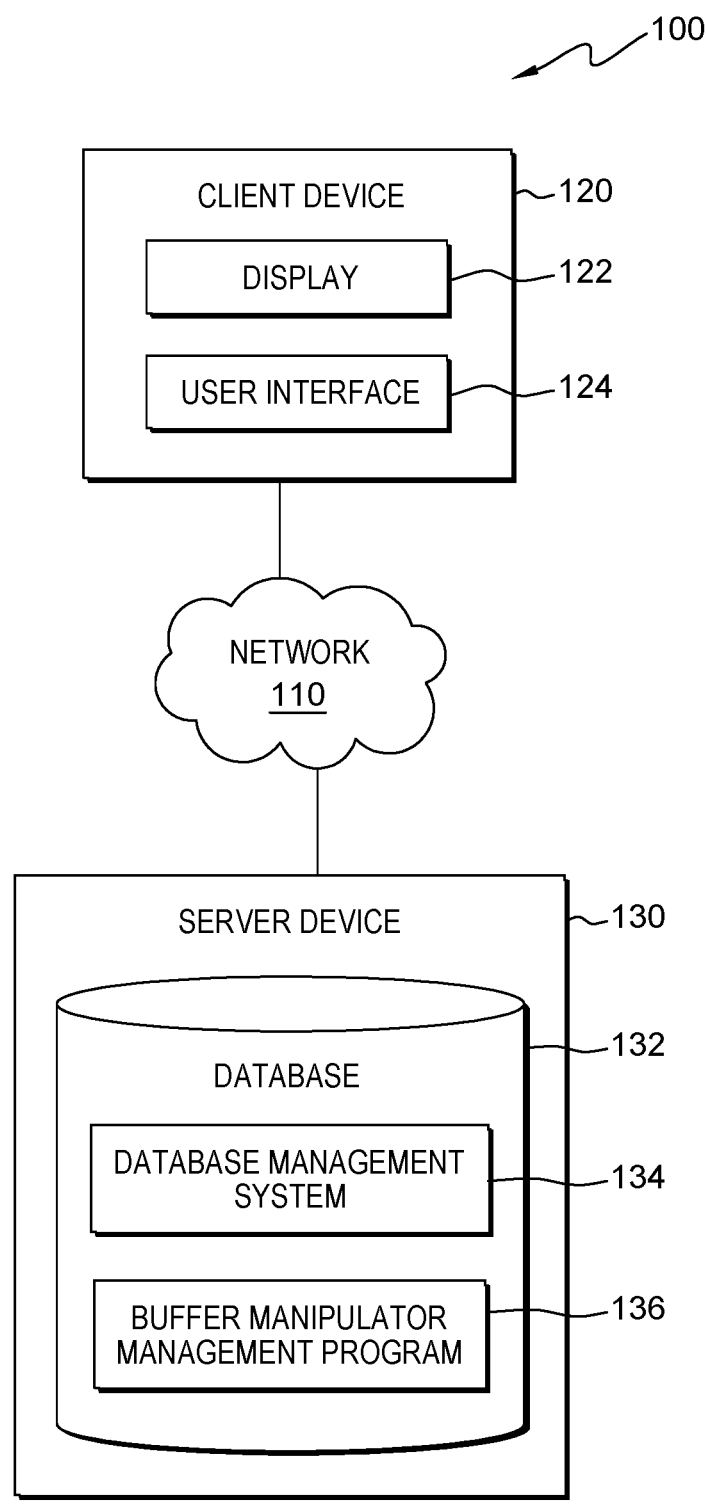
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120 and server device 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with client device 120 and server device 130 over network 110

In embodiments of the present invention, client device 120 and server device 130 are connected to network 110, which enables client device 120 and server device 130 to access other computing devices and/or data not directly stored on client device 120 and server device 130. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120 and server device 130, and any other computing devices (not shown in FIG. 1) connected to network 110, in accordance with embodiments of the present invention. In an embodiment, data received by another computing device (not shown in FIG. 1) in computing environment 100 is communicated to client device 120 and server device 130 via network 110.

According to embodiments of the present invention, client device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120 can be a standalone computing device, a management server, a web server, a mobile computing device, or any other electronic device or computing system capable of receiving, transmitting, and processing data. In other embodiments, client device 120 can represent computing systems utilizing multiple computers as a server system, such as in a cloud computing environment. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. In an embodiment, computing environment 100 includes any number of client device 120. Client device 120 may include internal and external hardware components as depicted and described in further detail with respect to FIG. 3, in accordance with embodiments of the present invention. Client device 120 may also include display 122 and user interface (UI) 124.

In an embodiment, display 122 is an electronic visual device for a desktop computer, laptop computer, tablet computer, smartphone, smart-watch, and the like. Display 122 may include a touchscreen which is an input device layered on top of the display for allowing a user to control an electronic device via simple or multi-touch gestures by touching display 122 with a special stylus and/or one or more fingers. Display 122 displays user interface 124 as well as open programs and applications, allowing a user of client device 120 to interact with the open programs and applications via a keyboard and mouse (not shown in FIG. 1) or via any other input technologies known in the art. Display 122 may be a thin film transistor liquid crystal display (TFT-LCD), a flat panel LED (light emitting diode) display, or a cathode ray tube (CRT). Display 122 may be connected to client device 120 via VGA (video graphics array), DVI (digital video interface), HDMI (High Definition Multi-Media Interface or any other connection type known in the art.

According to an embodiment of the present invention, user interface 124 provides an interface between client device 120 and server device 130. User interface 124 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124 may also be mobile application software that provides an interface between client device 120 and server device 130. Mobile application software, or an "app," is a computer program designed to run on smartphones, tablet computers and other mobile devices. User interface 124 enables a user of client device 120 to interact with server device 130 (e.g., requesting a database query), and other computing devices not shown in FIG. 1.

In embodiments of the present invention, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 may include internal and external hardware components as depicted and described in further detail with respect to FIG. 3, in accordance with embodiments of the present invention. Server device 130 may also include database 132.

According to an embodiment of the present invention, database 132 is a collection of information that is organized so that it can be easily accessed, managed, and updated. Databases typically contain aggregations of data records or files, containing information about such things as sales transactions or interactions with specific customers. In a relational database, digital information about specific information is organized into rows, columns, and tables which are indexed to make it easier to find relevant information through structure query language (SQL) or not only structured query language (NoSQL) queries. In contrast, a graph database uses nodes and edges to define relationships between data entries, and queries require a special semantic search syntax. In simple terms, a database such as database 132 includes a plurality of tablespaces, a tablespace includes one or more containers, each container includes a plurality of extents, and each extent is a block of storage that represents a number of pages. For the sake of simplicity, in this paper, database 132 is comprised of four tablespaces, each tablespace is comprised of one container, each container is comprised of one extent, and each extent is comprised of a varying number of pages. According to an embodiment, database 132 includes database management system 134 and buffer manipulator management program 136.

In an embodiment, database management system (DBMS) 134 is a software package designed to define, manipulate, retrieve and manage data in a database. DBMS 134 manipulates the data itself, the data format, field names, record structure, and file structure. DBMS 134 also defines rules to validate and manipulate this data. The core functions of DBMS 134 are the storage, retrieval, and update of data stored to database 132.

According to an embodiment of the present invention, buffer manipulator management program (BMMP) 136 can be a program, a subprogram of a larger program, an application, a plurality of applications, or mobile application software, which functions to improve the performance of the database backup process. A program is a sequence of instructions written by a programmer to perform a specific task. In an embodiment, BMMP 136 runs by independently. In other embodiments, BMMP 136 depends on system software (not shown in FIG. 1) to execute. In yet other embodiments, BMMP 136 works in conjunction with DBMS 134 during the backup of data stored to database 132. In one embodiment, BMMP 136 functions as a stand-alone program residing on server device 130. In another embodiment, BMMP 136 works in conjunction with other programs, applications, etc., found in computing environment 100. In yet another embodiment, BMMP 136 resides on client device 120. In yet another embodiment, BMMP 136 resides on other computing devices (not shown in FIG. 1) in computing environment 100, which are interconnected to client device 120 and server device 130 via network 110.

In an embodiment, BMMP 136 receives an indication of the start of a database backup process. In the embodiment, BMMP 136 marks the buffer manipulator threads active and determines the current extent being read in each table space. Further in the embodiment, BMMP 136 determines if there are any idle threads. Responsive to determining that at least one idle thread exists, BMMP 136 reassigns the at least one idle thread to the largest tablespace in the database and marks it as active. Further in the embodiment, BMMP 136 determines the current extent being backed up in the largest table space. Further yet in the embodiment, BMMP 136 assigns a number of extents for the reassigned thread. Further yet in the embodiment, BMMP 136 repeats the process of checking for idle threads until the backup process is complete.

Figure 2:
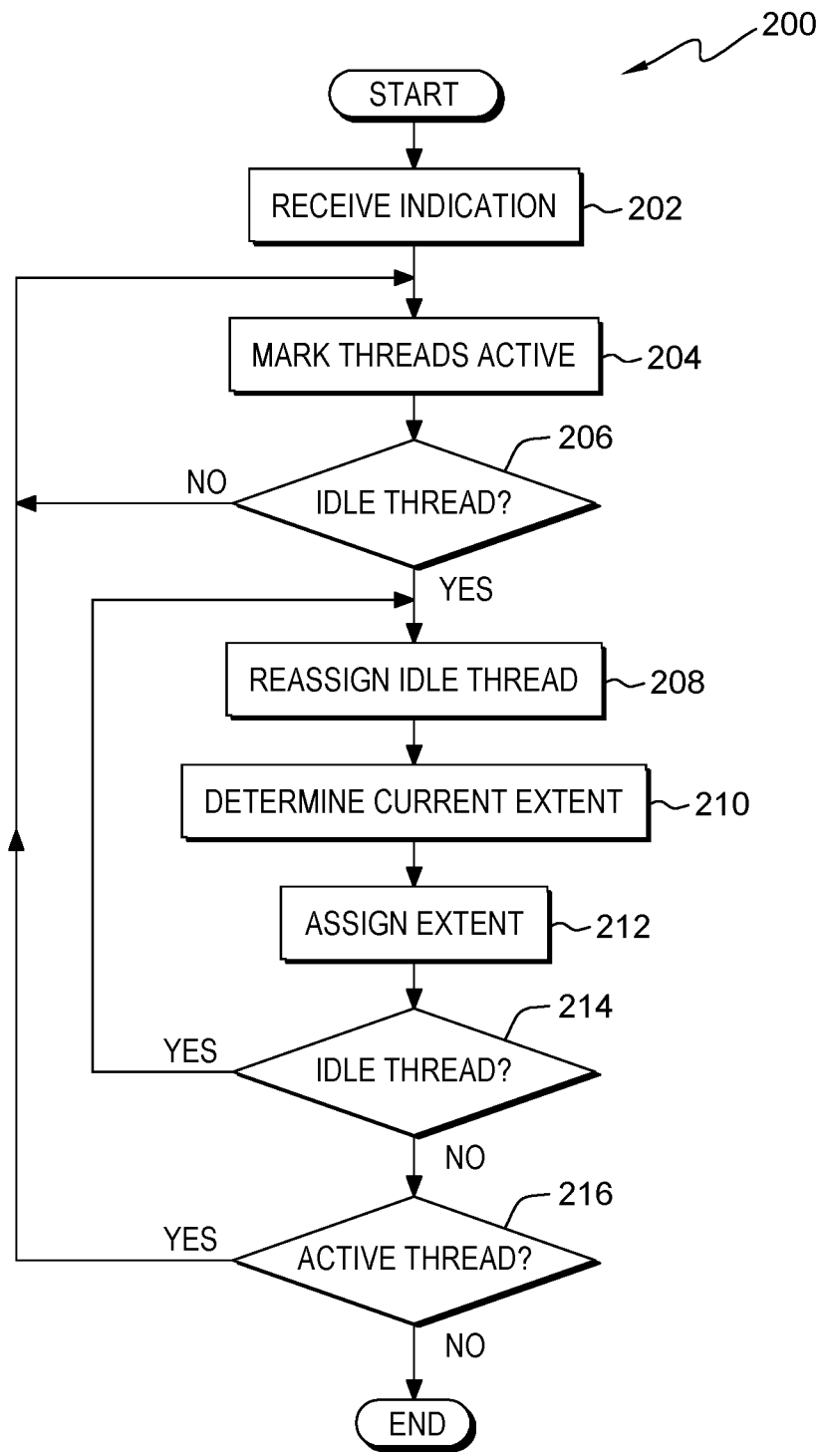
FIG. 2 depicts a flowchart of a program for improving the performance of the database backup process, in accordance with an embodiment of the present invention.

FIG. 2 is a flowchart of workflow 200 depicting a method for improving the performance of the database backup process. In one embodiment, the method of workflow 200 is performed by buffer manipulator management program (BMMP) 136. In an alternative embodiment, the method of workflow 200 is performed by any other program (e.g., database management system 134) working with BMMP 136. In an embodiment, a user, via user interface 124, invokes workflow 200 upon requesting a database backup. In an alternative embodiment, a user invokes workflow 200 upon accessing BMMP 136 on server device 130 via network 110.

In an embodiment, BMMP 136 receives an indication (step 202). In other words, BMMP 136 receives an indication of a database backup process starting. According to an embodiment of the present invention, BMMP 136 receives the indication from a database management system. According to another embodiment, BMMP 136 receives the indication from client device 120. In an embodiment, BMMP 136 receives an indication of a database server backup process starting from database management system (DBMS) 134 in database 132 on server device 130. For example, a program has received an indication of a user starting a backup for a company database.

According to an embodiment of the present invention, BMMP 136 marks threads active (step 204). In other words, in response to receiving the indication of a backup process starting, BMMP 136 identifies and marks all of the buffer manipulator (db2bm) threads in all of the table spaces found in the database as active. In an embodiment, the number of optimal db2bm threads is determined by, and subsequently created by, the DB2 agent (db2agent) thread. In the embodiment, a tablespace is a storage location where the actual data underlying database objects can be kept within the database. The tablespace provides a layer of abstraction between physical and logical data, and serves to allocate storage for all database management system managed segments. According to an embodiment, BMMP 136 marks the db2bm threads as active. For example, the backup of the company database has four tablespaces, each with one db2bm thread; therefore, four db2bm threads are marked as active. In the example, the four tablespaces and associated db2bm threads have the following information: (i) tablespace 'A', which is two hundred megabytes in size, is assigned the thread db2bm 'A'; (ii) tablespace 'B', which is five hundred megabytes in size, is assigned the thread db2bm 'B'; (iii) tablespace 'C', which is five gigabytes in size, is assigned the thread db2bm 'C'; and (iv) tablespace 'D', which is one terabyte in size, is assigned the thread db2bm 'D'. Thus, db2bm 'A', db2bm 'B', db2bm 'C', and db2bm 'D' are marked active.

According to an embodiment of the present invention, BMMP 136 determines whether any buffer manipulator (db2bm) threads are idle (decision step 206). In other words, BMMP 136 determines whether any of the db2bm threads previously marked as active have completed their portion of the backup process and are now idle (i.e., not active). In one embodiment (decision step 206, NO branch), BMMP 136 determines that none of the db2bm threads are idle; therefore, BMMP 136 returns to step 204 to mark any new db2bm threads active. In the embodiment (decision step 206, YES branch), BMMP 136 determines that at least one db2bm thread is idle; therefore, BMMP 136 proceeds to step 208 to reassign the at least one idle db2bm thread.

According to an embodiment of the present invention, BMMP 136 reassigns idle thread(s) (step 208). In other words, responsive to determining that one or more db2bm threads are idle, BMMP 136 reassigns the one or more idle db2bm threads to the largest tablespace within the database that is still being backed up. In an embodiment, an idle db2bm thread is a thread that has completed the backup process for the tablespace for which the thread was originally assigned. In the embodiment, the largest tablespace is the tablespace with the greatest storage capacity for storing data relative to the other tablespaces in the database. According to an embodiment of the present invention, BMMP 136 reassigns one or more idle db2bm threads from an original tablespace to the largest tablespace in database 132 on server device 130. For example, the program has determined that thread db2bm 'A', which was assigned to tablespace 'A' (the lowest capacity tablespace) has completed backing up tablespace 'A' and is now idle. In the example, thread db2bm 'A' is reassigned to perform backup on tablespace 'D', the highest capacity tablespace.

In an embodiment, BMMP 136 determines the current extent (step 210). In other words, responsive to reassigning one or more idle threads to the largest tablespace, BMMP 136 determines the current extent being read for backup in the largest tablespace stored to the database. According to an embodiment of the present invention, an extent is a block of storage in a container within a tablespace. The extent represents the plurality of pages of data within the container. In an embodiment, BMMP 136 determines the current extent being read for back up in the largest tablespace in database 132 on server device 130. For example, the program determines that in tablespace 'D' (which is the largest tablespace in the company database), extent twenty-five is being read for back-up.

According to an embodiment of the present invention, BMMP 136 assigns the extent (step 212). In other words, responsive to determining the current extent, BMMP 136 assigns a number of extents to the reassigned db2bm thread so that said thread can perform backup in the largest tablespace along with the previously assigned db2bm thread for the largest tablespace. In an embodiment, BMMP 136 assigns a number of extents of size "n". In one embodiment, "n" is predetermined by a user. In another embodiment, "n" is dynamically determined by BMMP 136 based on the size of the largest tablespace and the amount of data remaining to be backed up in the largest tablespace in the database that has not completed the backup process. According to an embodiment, BMMP 136 assigns the extent of size "n" to the reassigned thread which is now working in tablespace included in database 132 on server device 130. For example, if "n" is size thirty-two and db2bm 'D' is reading extent twenty-five in tablespace 'D' (the largest tablespace with backup still running), thread db2bm 'D' will read extents twenty-five through fifty-seven (or thirty-two pages of data). Therefore, thread db2bm 'A' is assigned extent fifty-eight and will read through extent ninety (or "n" equals thirty-two extents of data). Continuing the backup process, thread db2bm 'D' will start backup again at extent ninety-one (and will read thirty-two extents to extent one hundred twenty-three) while db2bm 'A' will start backup again at extent one-hundred twenty-four (and will read thirty-two extents to extent one hundred fifty-six). This process will repeat until (i) backup of tablespace 'D' is complete or (ii) another thread is reassigned to assist in the backup of tablespace 'D'. It should be noted that the above discussion is only an example of how the present invention would function when another idle thread is reassigned to the largest tablespace when said tablespace already has multiple threads performing backup. When one thread performing backup completes its assigned extents, it will be assigned the next set of extents (i.e., the multiple threads do not simply "take turns" backing up sets of extents). For example, if threads X, Y, and Z are backing up tablespace W, if thread Y finishes its set before threads X and Z finish their set, thread Y is assigned the next set.

Considering scenario (ii) above in the continuing example, additional thread db2bm 'B' has been reassigned to assist in the backup of tablespace 'D', where threads db2bm 'A' and db2bm 'D' are already performing the backup process. In the example, the current extents for threads db2bm 'A' (i.e., one hundred fifty-six) and db2bm 'D' (i.e., one hundred twenty-three) are determined, and based on those extents and an "n" of thirty-two extents, the correct extent for thread db2bm (i.e., one-hundred fifty-seven) would be determined. Each thread would then read their group of extents (thread db2bm 'D' would read through extent one hundred eighty-nine, thread db2bm 'D' would read extents one hundred ninety through extent two hundred twenty-two, and thread db2bm 'A' would read extents two hundred twenty-three through extents two hundred fifty-five) and the process would repeat until backup is complete or, yet another thread is reassigned to assist. In that case, a similar process as outlined above would occur.

In an embodiment, BMMP 136 determines whether there are other idle threads (decision step 214). In other words, responsive to assigning a number of extents to the first reassigned idle buffer manipulator thread, BMMP 136 determines whether there are one or more other idle buffer manipulator threads that could be reassigned. In one embodiment (decision step 218, YES branch), BMMP 136 determines that there are other idle db2bm threads; therefore, BMMP 136 returns to step 208 to reassign the determined other idle db2bm threads. In the embodiment (decision step 214, NO branch), BMMP 136 determines that there are not any other idle buffer manipulator threads; therefore, BMMP 136 proceeds to step 216 to determine whether any buffer manipulator threads are active.

According to an embodiment, BMMP 136 determines whether there are active threads (decision step 216). In other words, responsive to determining that there are no other idle db2bm threads, BMMP 136 determines whether there are any active db2bm threads. In an embodiment, one or more active db2bm threads indicate that the backup process is still running while no active db2bm threads indicate that the backup process is complete. In one embodiment (decision step 216, YES branch), BMMP 136 determines that there are still some number of active db2bm threads; therefore, BMMP 136 returns to step 204 to mark threads as active (if needed). In the embodiment (decision step 216, NO branch), BMMP 136 determines that there are no active db2bm threads; therefore, BMMP 136 ends.

Figure 3:
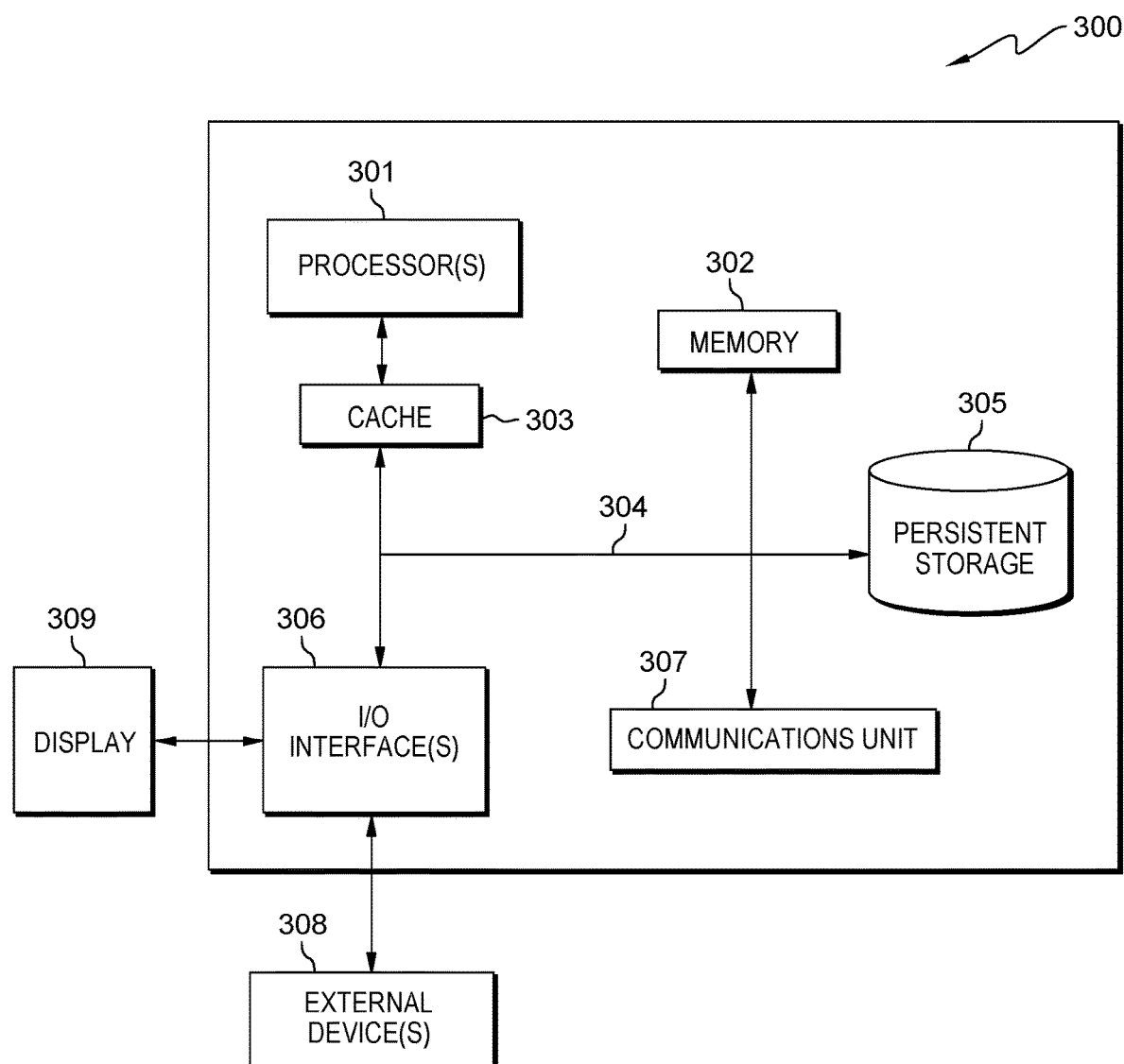
FIG. 3 depicts a block diagram of components of the computing environment of FIG. 1, in accordance with an embodiment of the present invention.

FIG. 3 depicts computer system 300, which is an example of a system that includes BMMP 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. PO interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
receiving, by one or more computer processors, an indication of a database backup process starting;
marking, by one or more computer processors, a plurality of buffer manipulator threads as active;
determining, by one or more computer processors, whether any of the plurality of buffer manipulator threads marked as active in the database backup process become idle; and
responsive to determining that at least one buffer manipulator thread in the database backup process becomes idle, reassigning, by one or more computer processors, the at least one idle buffer manipulator thread to a first largest tablespace in the database that has not completed the database backup process, wherein the first largest tablespace has a largest storage capacity relative to other tablespaces in the database.

2. The method of claim 1, further comprising:
determining, by one or more computer processors, a current extent of the first largest tablespace in the database; and
assigning, by one or more computer processors, a number of extents to the reassigned at least one idle buffer manipulator thread based on the determined current extent of the first largest tablespace in the database that has not completed the backup process.

3. The method of claim 2, wherein the step of assigning, by one or more computer processors, a number of extents to the reassigned buffer manipulator thread based on the determined current extent of the first largest tablespace in the database that has not completed the backup process, comprises:
assigning, by one or more computer processors, "n" extents to the determined current extent, wherein:
"n" is the number of extents to be read into storage; and
wherein determining "n" is selected from the group consisting of "n" being predetermined by a user and "n" being dynamically determined by a program based on a size of the largest tablespace and an amount of data remaining to be backed up in the largest tablespace in the database that has not completed the backup process.

4. The method of claim 2, wherein the current extent is a block of storage in the largest tablespace and represents a plurality of pages of data stored to the database.

5. The method of claim 1, further comprising:
responsive to assigning the number of extents to the reassigned at least one idle buffer manipulator thread based on the determined current extent of the first largest tablespace in the database, determining by one or more computer processors, whether additional buffer manipulator threads have become idle; and
responsive to determining that at least one additional buffer manipulator thread has become idle, reassigning, by one or more computer processors, the at least one additional buffer manipulator thread that has become idle to a second largest tablespace in the database that is in the database backup process.

6. The method of claim 5, wherein the first largest tablespace and the second largest tablespace are selected from the group consisting of a same tablespace and two different tablespaces.

7. The method of claim 1, wherein the database is comprised of two or more tablespaces.

8. A computer program product, the computer program product comprising:
one or more computer readable storage media; and
program instructions stored on the one or more computer readable storage media, the program instructions comprising:
program instructions to receive an indication of a database backup process starting;
program instructions to mark a plurality of buffer manipulator threads as active;
program instructions to determine whether any of the plurality of buffer manipulator threads marked as active in the database backup process become idle; and
responsive to determining that at least one buffer manipulator thread in the database backup process becomes idle, program instructions to reassign the at least one idle buffer manipulator thread to a first largest tablespace in the database that has not completed the database backup process, wherein the first largest tablespace has a largest storage capacity relative to other tablespaces in the database.

9. The computer program product of claim 8, further comprising program instructions stored on the one or more computer readable storage media, to:
determine a current extent of the first largest tablespace in the database; and
assign a number of extents to the reassigned at least one idle buffer manipulator thread based on the determined current extent of the first largest tablespace in the database that has not completed the backup process.

10. The computer program product of claim 9, wherein program instructions stored on the one or more computer readable storage media to assign a number of extents to the reassigned buffer manipulator thread based on the determined current extent of the first largest tablespace in the database that has not completed the backup process, comprise:
program instructions to assign "n" extents to the determined current extent, wherein:
"n" is the number of extents to be read into storage; and
wherein determining "n" is selected from the group consisting of "n" being predetermined by a user and "n" being dynamically determined by a program based on a size of the largest tablespace and an amount of data remaining to be backed up in the largest tablespace in the database that has not completed the backup process.

11. The computer program product of claim 9, wherein the current extent is a block of storage in the largest tablespace and represents a plurality of pages of data stored to the database.

12. The computer program product of claim 8, further comprising program instructions stored on the one or more computer readable storage media, to:
responsive to assigning the number of extents to the reassigned at least one idle buffer manipulator thread based on the determined current extent of the first largest tablespace in the database, determine whether additional buffer manipulator threads have become idle; and responsive to determining that at least one additional buffer manipulator thread has become idle, reassign the at least one additional buffer manipulator thread that has become idle to a second largest tablespace in the database that is in the database backup process.

13. The computer program product of claim 12, wherein the first largest tablespace and the second largest tablespace are selected from the group consisting of a same tablespace and two different tablespaces.

14. The computer program product of claim 8, wherein the database is comprised of two or more tablespaces.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to receive an indication of a database backup process starting;
program instructions to mark a plurality of buffer manipulator threads as active;
program instructions to determine whether any of the plurality of buffer manipulator threads marked as active in the database backup process become idle; and
responsive to determining that at least one buffer manipulator thread in the database backup process becomes idle, program instructions to reassign the at least one idle buffer manipulator thread to a first largest tablespace in the database that has not completed the database backup process, wherein the first largest tablespace has a largest storage capacity relative to other tablespaces in the database.

16. The computer system of claim 15, further comprising program instructions stored on the one or more computer readable storage media for execution by at least one of the one or more computer processors, to:
determine a current extent of the first largest tablespace in the database; and
assign a number of extents to the reassigned at least one idle buffer manipulator thread based on the determined current extent of the first largest tablespace in the database that has not completed the backup process.

17. The computer system of claim 16, wherein program instructions stored on the one or more computer readable storage media for execution by at least one of the one or more computer processors to assign a number of extents to the reassigned buffer manipulator thread based on the determined current extent of the first largest tablespace in the database that has not completed the backup process, comprise:
program instructions to assign "n" extents to the determined current extent, wherein:
"n" is the number of extents to be read into storage; and
wherein determining "n" is selected from the group consisting of "n" being predetermined by a user and "n" being dynamically determined by a program based on a size of the largest tablespace and an amount of data remaining to be backed up in the largest tablespace in the database that has not completed the backup process.

18. The computer system of claim 16, wherein the current extent is a block of storage in the largest tablespace and represents a plurality of pages of data stored to the database.

19. The computer system of claim 15, further comprising program instructions stored on the one or more computer readable storage media for execution by at least one of the one or more computer processors, to:
responsive to assigning the number of extents to the reassigned at least one idle buffer manipulator thread based on the determined current extent of the first largest tablespace in the database, determine whether additional buffer manipulator threads have become idle; and
responsive to determining that at least one additional buffer manipulator thread has become idle, reassign the at least one additional buffer manipulator thread that has become idle to a second largest tablespace in the database that is in the database backup process.

20. The computer system of claim 19, wherein the first largest tablespace and the second largest tablespace are selected from the group consisting of a same tablespace and two different tablespaces.

* * * * *